United States Patent
Hata et al.

(10) Patent No.: US 7,746,370 B2
(45) Date of Patent: Jun. 29, 2010

(54) IMAGE FORMING APPARATUS AND METHOD OF CONTROLLING SAME

(75) Inventors: Shigeo Hata, Ibaraki-ken (JP); Katsuhide Koga, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 11/889,380

(22) Filed: Aug. 13, 2007

(65) Prior Publication Data

US 2007/0291101 A1     Dec. 20, 2007

Related U.S. Application Data

(62) Division of application No. 11/075,854, filed on Mar. 10, 2005, now Pat. No. 7,268,797.

(30) Foreign Application Priority Data

Mar. 16, 2004   (JP) .............................. 2004-074711

(51) Int. Cl.
  B41J 2/435   (2006.01)
  B41J 2/47    (2006.01)
(52) U.S. Cl. ....................... 347/237; 347/247
(58) Field of Classification Search ............... 347/236, 347/237, 246, 247
  See application file for complete search history.

(56) References Cited

U.S. PATENT DOCUMENTS

| | | | |
|---|---|---|---|
| 4,746,987 A | 5/1988 | Traino et al. | 358/406 |
| 4,757,191 A | 7/1988 | Shimada et al. | 250/205 |
| 5,309,177 A | 5/1994 | Shoji et al. | 347/131 |
| 6,266,078 B1 | 7/2001 | Koga et al. | 347/236 |
| 6,396,858 B2 | 5/2002 | Kawakami et al. | 347/38.02 |
| 6,466,244 B2 | 10/2002 | Itoh | 347/132 |
| 6,549,265 B1 | 4/2003 | Sakakibara et al. | 355/35 |
| 6,795,099 B2 | 9/2004 | Koga et al. | 347/129 |
| 6,919,979 B2 | 7/2005 | Seki et al. | 359/204 |
| 7,170,544 B2 | 1/2007 | Horiuchi | 347/247 |

FOREIGN PATENT DOCUMENTS

| | | |
|---|---|---|
| JP | 5-188707 | 7/1993 |
| JP | 05188707 A  * | 7/1993 |
| JP | 7-294837 | 11/1995 |
| JP | 2000-071510 | 3/2000 |
| JP | 2002-063787 | 3/2002 |
| JP | 2002-067387 | 3/2002 |
| JP | 2003-263002 | 9/2003 |

OTHER PUBLICATIONS

Japanese Office Action dated Nov. 24, 2009, from corresponding Japanese Application No. 2004-074711.

* cited by examiner

*Primary Examiner*—Hai C Pham
(74) *Attorney, Agent, or Firm*—Fitzpatrick, Cella, Harper & Scinto

(57) ABSTRACT

One scanning interval of a laser beam is divided into a plurality of blocks, correction data, which corresponds to optical characteristics of an optical unit placed between a laser element and a photosensitive drum, is stored in memory in association with each block, the correction data corresponding to a block being scanned by the laser beam is read out of the memory, and the laser is driven upon correcting the laser drive signal based upon the correction data read out and correction data corresponding to a block adjacent to the block being scanned by the laser.

5 Claims, 8 Drawing Sheets

F I G. 8
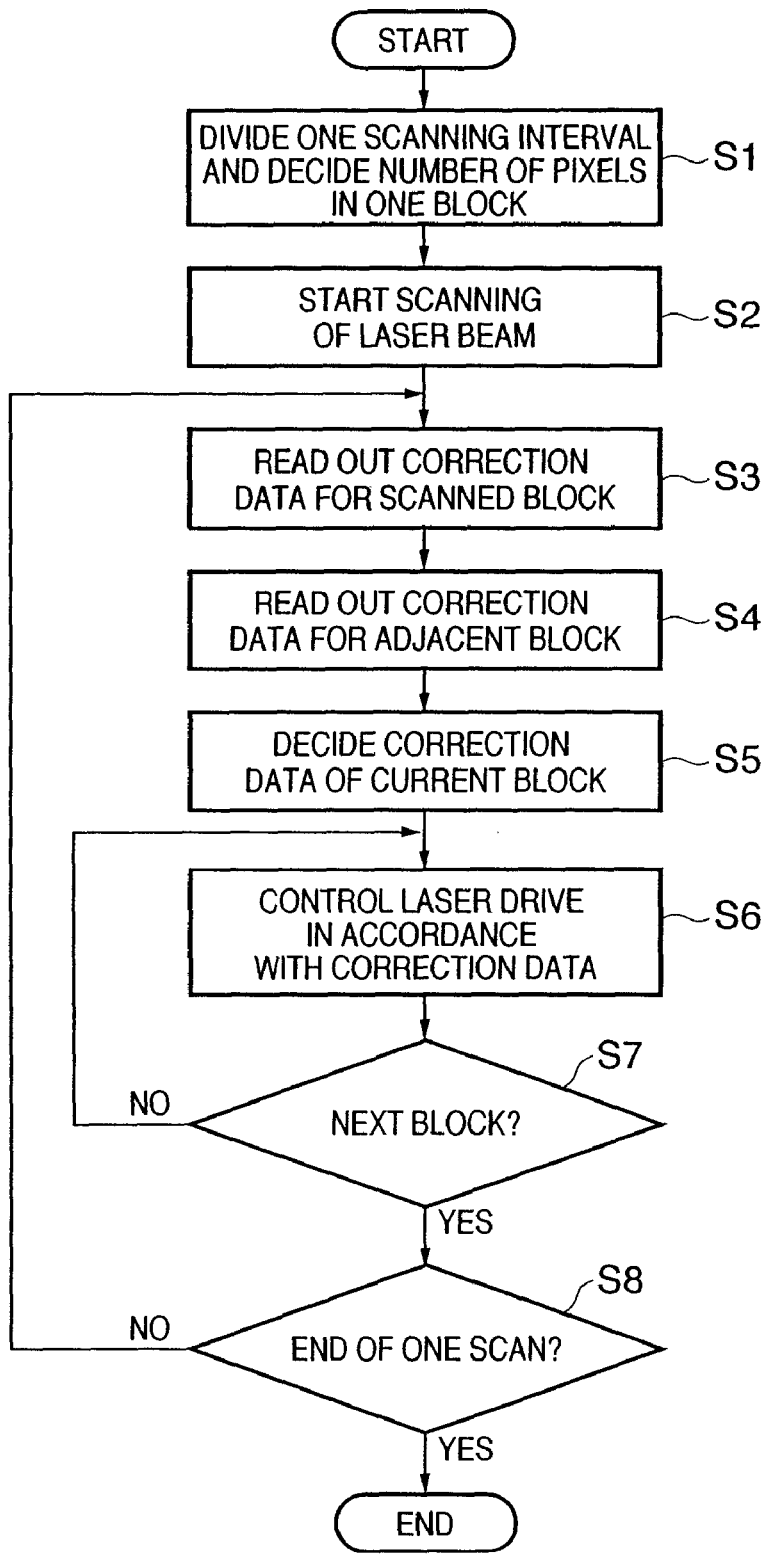

IMAGE FORMING APPARATUS AND METHOD OF CONTROLLING SAME

This application is a division of application Ser. No. 11/075,854, filed Mar. 10, 2005, the contents of which are incorporated herein by reference.

FIELD OF THE INVENTION

This invention relates to an image forming apparatus for irradiating an electrically charged photosensitive material with a laser beam and forming an electrostatic latent image to thereby form an image.

BACKGROUND OF THE INVENTION

An image forming apparatus for forming an image by electrophotography includes a charging unit for uniformly charging the photosensitive surface of a photosensitive drum, a latent-image forming unit for forming an electrostatic latent image, which conforms to image information, on the charged photosensitive surface, a developing unit for developing the electrostatic latent image using toner, and a transfer unit for transferring the developed latent image to a printing sheet. The apparatus executes image forming processing successively while rotating the photosensitive drum.

Among the types of photosensitive drums that can be used, an amorphous silicon drum has a higher durability that than of an organic semiconductor drum employed generally in the prior art and has already found practical use in monochrome copiers. However, a characteristic of an amorphous photosensitive drum is that it exhibits sensitivity unevenness ascribable to a variance in the thickness of the photosensitive film, this being a problem related to manufacture. Sensitivity unevenness affects charging and the exposure characteristic and gives rise to irregular density in the image formed. Further, density unevenness in an image is produced not only by sensitivity unevenness of the photosensitive drum but also by a variance in the optical unit inside the image forming unit. The variance in the optical unit referred to here is attributed to the mounting precision of lenses and mirrors within the optical unit. With an optical unit that has a plurality of lasers, the variance manifests itself as a deviation in the images obtained by irradiation with the lasers and as a shift in the optical axis.

Such density unevenness has not posed much of a problem in the past but is now a problem that the market cannot allow owing to the demand for higher image quality in recent years.

In an effort to solve this problem, the conventional approach has been to suppress variance in the optical unit per se, i.e., to suppress variance by raising the mounting precision of the lenses and mirrors in the optical unit, or to select manufactured parts that satisfy certain conditions so that variance is held below a prescribed value, or to improve the finished precision of the component parts. Alternatively, as disclosed in the specification of Japanese Patent Application Laid-Open No. 7-294837, polarized-light correcting means is provided within the optical unit and a correction is applied by the correcting means, thereby uniformalizing the amount of light in scanning so as to suppress density unevenness.

With these examples of the prior art, however, it is necessary to suppress the sensitivity unevenness of the photosensitive drum or to raise the precision of the optical unit and to perform the required adjustments and selections. The result is in increase in the cost of the apparatus.

SUMMARY OF THE INVENTION

Accordingly, a feature of the present invention is to eliminate the drawbacks of the prior art.

Another feature of the present invention is to provide an image forming apparatus and method of controlling same in which unevenness of a photosensitive drum or optical unit is corrected to enable the formation of a high-quality image while a rise in the cost of the apparatus is suppressed.

According to an aspect of the present invention, there is provided with an image forming apparatus for irradiating an electrically charged photosensitive material with a laser beam and forming an electrostatic latent image to thereby form an image, comprising:

storage means for dividing one scanning interval of the laser beam into a plurality of blocks, and storing correction data, which corresponds to optical characteristics of an optical unit placed between a laser element and the photosensitive material, in association with each block;

readout means for reading first correction data, which corresponds to a block being scanned by the laser beam, out of the storage means; and driving control means for correcting a drive signal of the laser element and driving the laser element based upon the first correction data, which has been read out by the readout means, and second correction data, which corresponds to a block adjacent the block being scanned by the laser beam.

Further, according to another aspect of the present invention, there is provided with a method of controlling an image forming apparatus for irradiating an electrically charged photosensitive material with a laser beam and forming an electrostatic latent image to thereby form an image, comprising:

a step of storing correction data corresponding to electrification characteristics of the photosensitive material;

a readout step of reading first correction data, which corresponds to a block being scanned by the laser beam, out of the memory; and a driving control step of correcting a drive signal of the laser element and driving the laser element based upon the first correction data, which has been read out in the readout step, and second correction data, which corresponds to a block adjacent the block being scanned by the laser beam.

The above-described features are attained by a combination of the features set forth in the main claim. The dependent claims stipulate useful specific examples of the invention.

The gist of the invention does list all the necessary features and therefore subcombinations of groups of these features are also possible according to the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart for describing laser drive control in a color printer according to this embodiment.

DETAILED DESCRIPTION OF THE PREFERRED EMBODIMENTS

Preferred embodiments of the present invention will now be described in detail with reference to the accompanying drawings. It should be noted that the embodiments set forth below do not limit the invention set forth in the claims. In addition, the combinations of features described in the specification are not all necessarily essential for attaining the objects of the invention. Furthermore, a color copier having a single photosensitive drum is described in the embodiments. However, the present invention is not limited to such a single-drum type copier. For example, the invention may include a plurality of image forming units for the colors Y (yellow), M (magenta), C (cyan), Bk (black) arranged along the transport path of a printing sheet.

Figure 1:
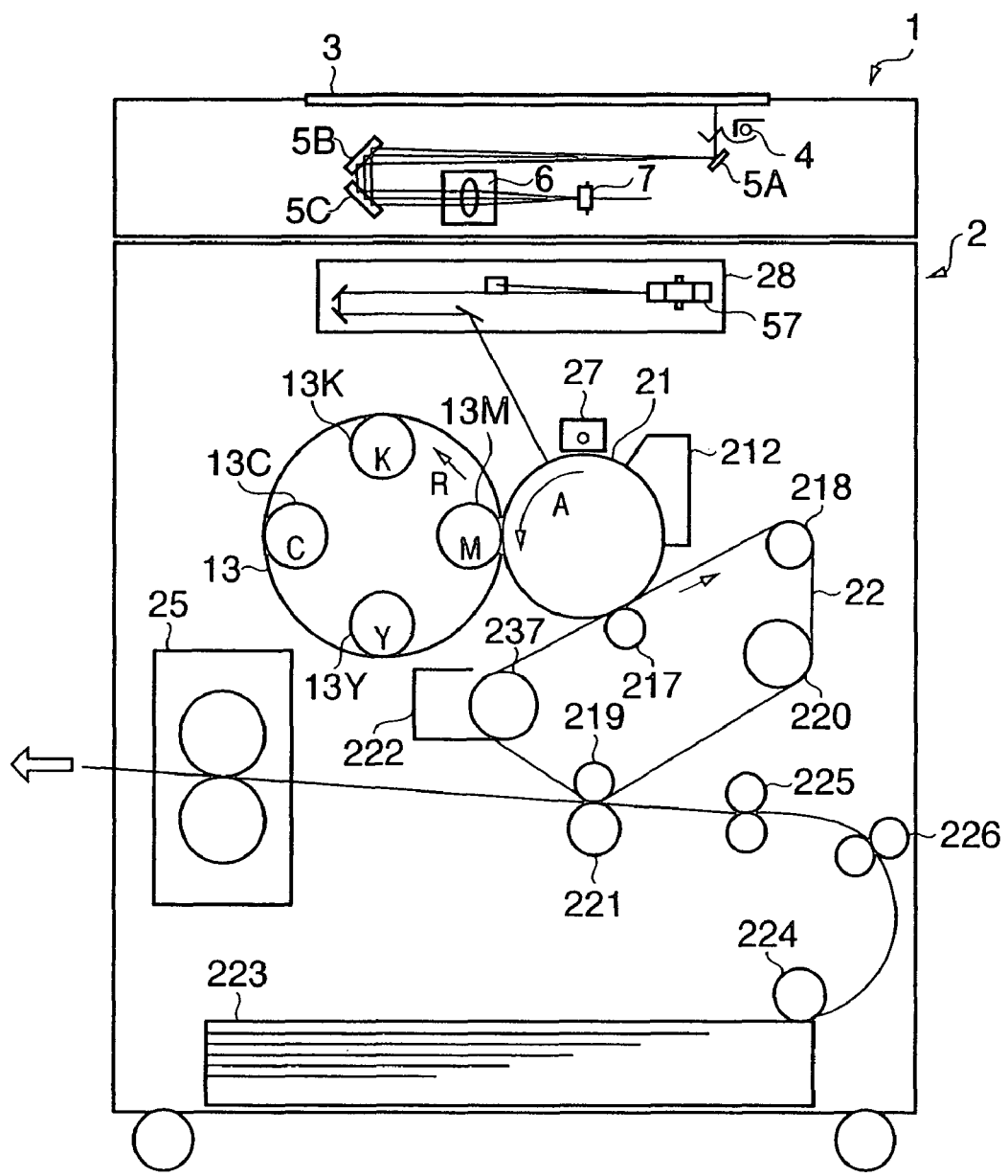
FIG. 1 depicts a schematic structural view for describing the overall structure of a color copier according to an embodiment of the present invention.

FIG. 1 depicts a schematic structural view for describing the overall structure of a color copier according to an embodiment of the present invention. This color copier is equipped with an image reader (hereinafter, a color scanner) 1 for reading a color original and generating a color image signal corresponding to the color original, and a color image printing unit (hereinafter, color printer) 2.

The color scanner 1 forms the image of an original 3 on a color sensor 7 via an illuminating lamp 4, mirror group 5 (5A to 5C) and lens 6, reads color image information of the original 3 for each of the separated colors of blue (B), green (G) and red (R) and generates color signals and converts each of these color signals to an electrical image signal. The image signals of each of the color components B, G, R generated by the color scanner 1 are subjected to color conversion processing by an image processing unit (not shown) so that image data of the color components represented by colorants such as inks of black (Bk), cyan (C), magenta (M) and yellow (Y) are obtained from the three primary colors (R, G, B) of light.

The color printer 2 will be described next.

Color image data of the components C, M, Y, Bk from the color scanner 1 enters a laser irradiation unit (optical unit) 28, which converts the image data to laser light to scan a photosensitive drum 21 upon being reflected by a polygon mirror 57. The surface of the photosensitive drum 21 is electrically charged uniformly by a charger 27, after which the surface is exposed by laser light from the laser irradiation unit 28. As a result, an electrostatic latent image conforming to the image of the original is formed on the surface of the photosensitive drum 21. The latter is rotated in the counter-clockwise direction, as indicated by arrow A. Provided about the photosensitive drum 21 are a drum cleaning unit (which includes a device for removing electric charge prior to cleaning) 212, the charger 27 and a rotating developer 13 comprising an M developer 13M, a C developer 13C, a Y developer 13Y and a Bk developer 13K held on a rotary body. The rotating developer 13 is rotated and is placed at a position where the M developer 13M, C developer 13C, Y developer 13Y and Bk developer 13K will contact the photosensitive drum 21, whereby the toner of the corresponding color becomes affixed to the photosensitive drum 21 in conformity with the electrostatic latent image on the photosensitive drum 21. Whenever the electrostatic latent image of each color is formed on the photosensitive drum 21, the color image is transferred to an intermediate transfer belt 22, which is an intermediate transfer body. Thus, a full-color image that is the result of superposition of images of the colors Y, M, C, Bk is formed on the intermediate transfer belt 22. The image transfer to the intermediate transfer belt 22 is implemented by the action of a primary transfer via roller 217. The intermediate transfer belt 22 is engaged by a drive roller 220 for transporting and driving the intermediate transfer belt 22 by a drive motor, and a group of follower rollers 218, 219, 237. A secondary transfer bias roller 221 is disposed at a position opposing the follower roller 219 of the intermediate transfer belt 22, and a mechanism for driving the secondary transfer bias roller 221 so as to bring it into and out of contact with the intermediate transfer belt 22. A belt cleaning unit 222 is provided at the surface of the intermediate transfer belt 22 at a position opposing the follower roller 237. The operation timing at which the belt cleaning unit 222 makes and breaks contact with the belt 22 is such that the belt cleaning unit 222 is spaced away from the belt 22 from the start of printing until the trailing end of the image of the final color is transferred from the belt 22 to the printing sheet. Then, at a prescribed timing thereafter, the belt cleaning unit 222 is contacted with the belt by a mechanism (not shown) to clean the intermediate transfer belt 22.

Image transfer to the printing sheet will be described next. The uppermost printing sheet of a plurality of printing sheets accommodated in a paper cassette 223 is extracted from the paper cassette 223 by rotation of a pick-up roller 224 and is conveyed to the transfer position of the secondary transfer bias roller 221 through a pair of conveyance rollers 226, 225. A full-color image on the intermediate transfer belt 22 is transferred to the printing sheet by the contact pressure and bias potential of the secondary transfer bias roller 221. The printing sheet to which the color image has thus been transferred is sent to a fixing unit 25, where the image is fixed.

It should be noted that each of the developers 13M, 13Y, 13C, 13K comprises a developing sleeve that rotates to bring the crest of the developing agent (toner) into contact with the surface of the photosensitive drum 21 in order to develop the electrostatic latent image, and a developing paddle that rotates in order to draw up and stir the toner in each developer.

Figure 2:
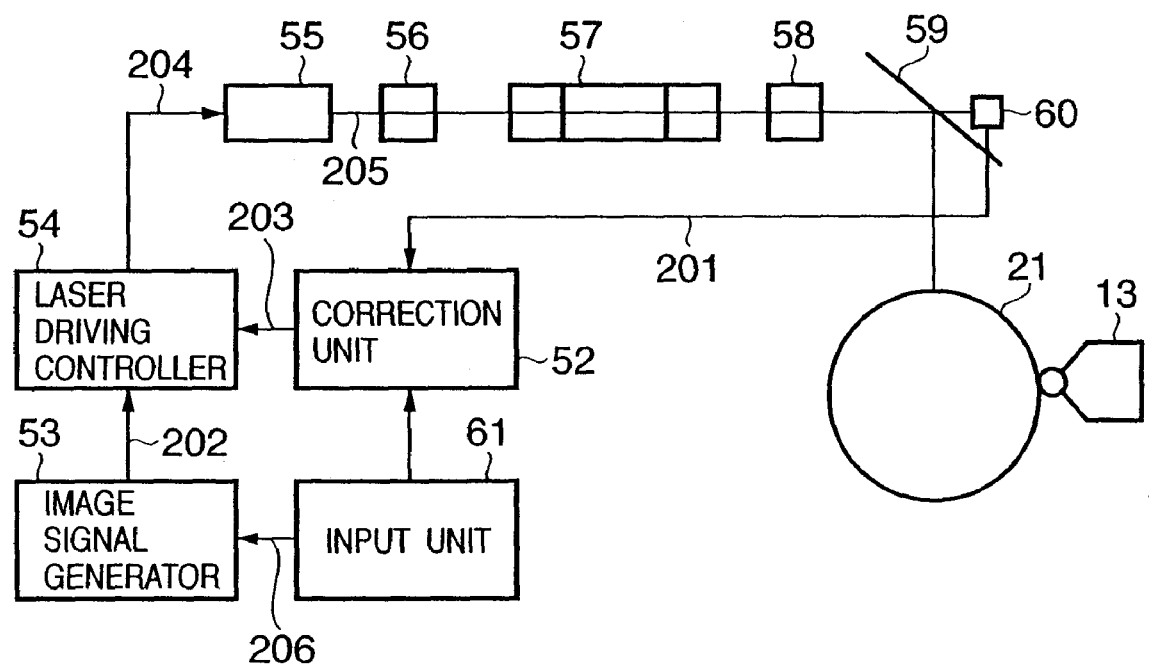
FIG. 2 is a block diagram for describing the structure of a laser irradiation unit and its peripheral units in a color printer according to this embodiment.

FIG. 2 is a diagram useful in describing the structure of the laser irradiation unit 28 and its peripheral units in the color printer 2 according to this embodiment. Components similar to those in FIG. 1 described above are designated by like reference characters.

When a semiconductor laser 55 is driven by a laser driving controller 54 based upon an image signal 202 generated by an image signal generator 53, a laser beam 205 is emitted from the semiconductor laser 55. After passing through a collimating lens 56, the laser beam 205 is reflected by a polygon mirror 57 and converted to a scanning signal. The reflected laser beam passes through an fθ lens 58 and is reflected by a mirror 59 to thereby scan the surface of the photosensitive drum 21 along the longitudinal direction of the drum 21. As a result, the electrostatic latent image corresponding to the image signal is formed on the surface of the photosensitive drum 21. A beam detector (BD) 60 detects the start timing of one scan by the laser beam and generates a horizontal synchronization signal. An input unit 61 inputs correction data, which is described later, to a correction unit 52.

The operation of the laser irradiation unit 28 will be described next.

Correction data 206 is input to the correction unit 52 from the input unit 61. A barcode reader for reading and inputting a barcode or an operation unit that is operated by the user to enter various data may serve as the input unit 61. Alternatively, the correction data may be input by installing an EEPROM in which the correction data has been stored beforehand. Next, in sync with a BD signal 201 that is output from beam detector 60, the current value or drive time of a drive (light-emission) signal 204 of the semiconductor laser 55 output from the laser driving controller 54 is controlled in accordance with the image signal 202 generated by the image signal generator 53 and a correction signal 203 that conforms to the optical characteristic of the optical unit output from the correction unit 52. According to the current control method of this embodiment, it is permissible to control the absolute value of the current or the time during which the current is passed or both.

The laser beam 205 that has been emitted from the semiconductor laser 55 is collimated by the collimating lens 56. The collimated laser beam is deflected in the primary scan direction by the polygon mirror 57, thereby performing the primary scan. At this time optical distortion such as leaning of the plane is corrected by the fθ lens 58, the laser beam is reflected by a mirror 59 and irradiates the surface of the photosensitive drum 21 to form an electrostatic latent image on the surface of the photosensitive drum 21. The electrostatic image thus formed on the photosensitive drum 21 is developed by the developer 13, and the developed image is transferred to and fixed on the printing sheet by a well-known electrophotography process.

Figure 3:
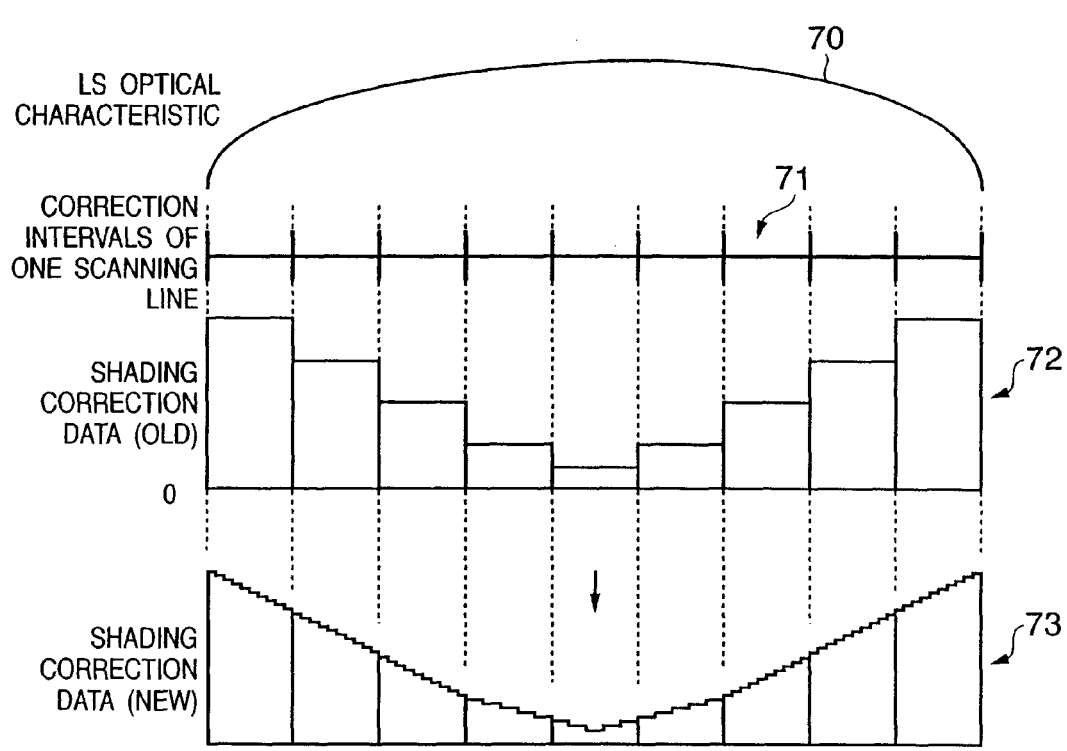
FIG. 3 depicts a diagram useful in describing the concept of a correction by a correction unit in an optical unit according to a first embodiment.

FIG. 3 is a diagram useful in describing the correction performed by the correction unit 52 of the laser irradiation unit 28 according to this embodiment.

Shown in FIG. 3 are an optical characteristic 70 of the unit 28 and correction resolution (number of items of data stored in memory) 71 along the primary scan direction. In this embodiment, one scanning line of pixels is divided into a plurality of blocks (nine blocks in the example of FIG. 3) and a shading correction (73) is performed by changing over the correction data in stages within each block.

Also shown in FIG. 3 are correction data 72 for optical properties, this being data (old) for performing a shading correction, and correction data 73 for optical properties according to this embodiment, this data being data (new) for performing a shading correction. At the timing at which the laser beam irradiates the photosensitive drum 21 based upon the BD signal 201, the correction unit 52 outputs the corresponding optical-properties correction data 73 to the laser driving controller 54 as the correction signal 203, thereby controlling the driving of the semiconductor laser 55. In the example of FIG. 3, the steps of the correction data 73 near both ends of one scanning line differ from those near the middle of the line. However, since the difference between items of correction data of adjacent correction intervals is small near the middle of the line, step width is coarse as a result.

Figure 4:
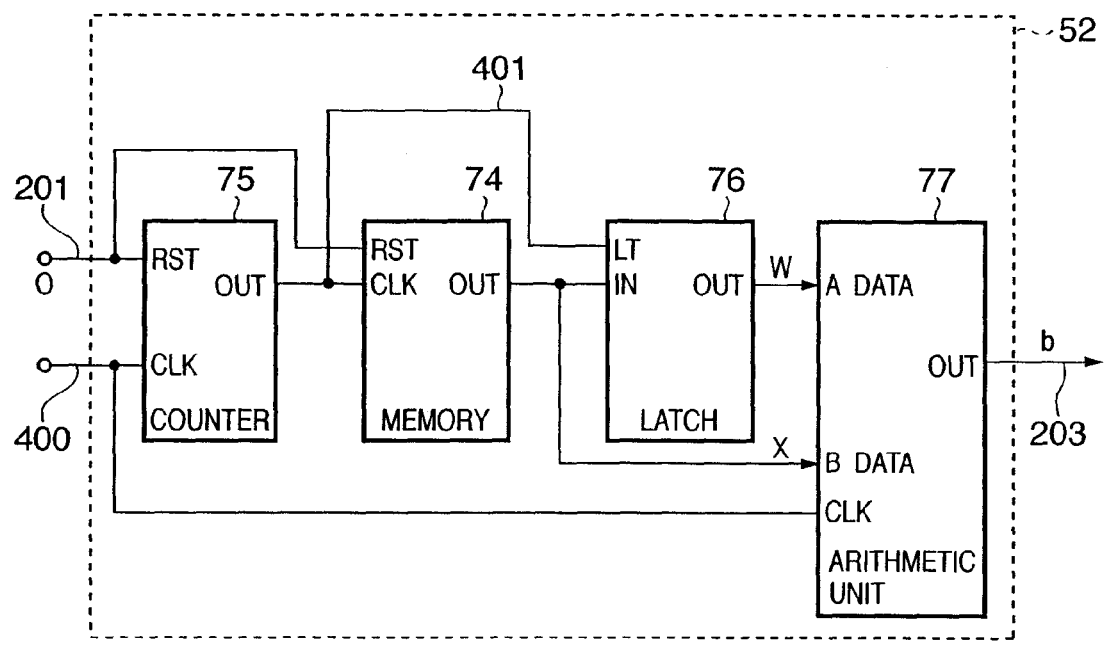
FIG. 4 is a block diagram illustrating the structure of the correction unit according to the first embodiment.

FIG. 4 is a block diagram illustrating the structure of the correction unit 52 according to this embodiment.

The optical-property correction data 72 for the optical unit 28 is stored in a memory 74 in advance.

Figure 5:
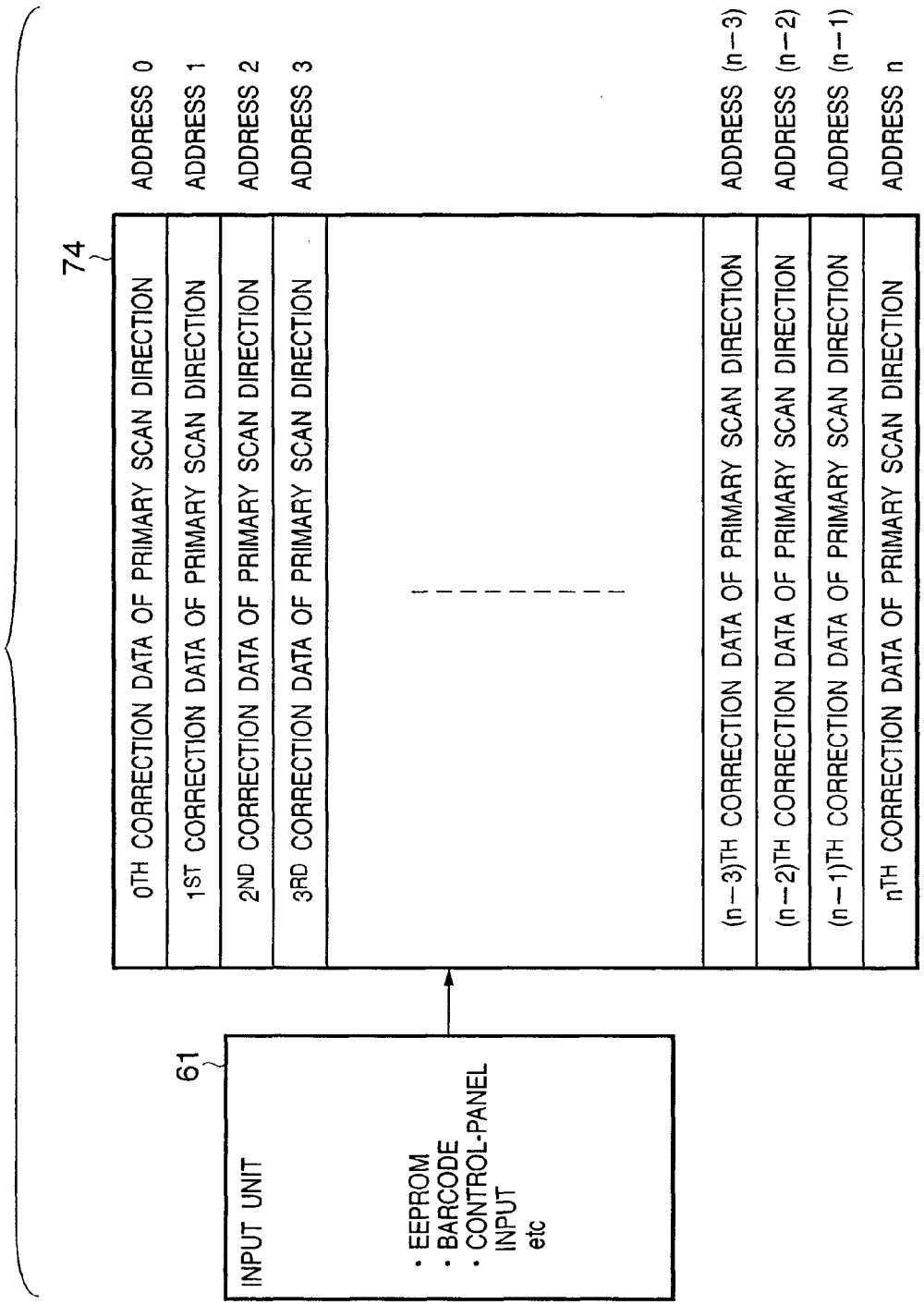
FIG. 5 is a diagram useful in describing the placement of correction data that has been stored in a memory.

FIG. 5 is a diagram useful in describing the storage of the data in the memory 74.

A counter 75 is reset by the BD signal 201 and counts a pixel clock (CLK) 400 that is synchronized to the pixel data printed. The counter 75 is, e.g., a 4-bit counter the output (OUT) 401 of which is a carry signal produced whenever the counter 75 counts up to "16". The value of "16" counted by the counter 75 corresponds to the number of pixels in one correction interval 71 of one scanning line indicated in FIG. 3.

The memory 74, which is a FIFO memory, for example, outputs correction data successively from a $0^{th}$ item of correction data, which is shown in FIG. 5, in sync (i.e., every 16 pixels) with the output 401 of the counter 75.

A latch 76 latches the data, which has been output from the memory 74, in sync with the output of the counter 75. An arithmetic unit 77 obtains linear interpolation data from two input signals comprising ADATA, which is the output (W) of the latch 76, and BDATA, which is the output (X) of the memory 74. The OUT signal of the arithmetic unit 77 is output in sync with the pixel clock (CLK) 400 and constitutes the correction signal 203, which is the optical-properties correction data 73 shown in FIG. 3.

FIG. 5 is a diagram useful in describing the placement of the correction data that has been stored in the memory 74.

The correction data 206 that has entered from the input unit 61 is stored in memory 74 from a $0^{th}$ address to an $n^{th}$ address along the primary scan direction.

The correction data is stored from address 0 of memory 74 in order starting from $0^{th}$ correction data of the primary scan direction. Whenever the CLK signal 400 enters, correction data is output from the addresses in ascending order (i.e., from addresses 0 to n in the order mentioned).

In this example, the correction data that has entered from the input unit 61 is illustrated as being stored in the memory 74. However, in a case where an EPROM storing the correction data is provided, the EPROM may serve as the memory and it may be so arranged that the correction data is read out of the memory (EPROM) directly.

Figure 6:
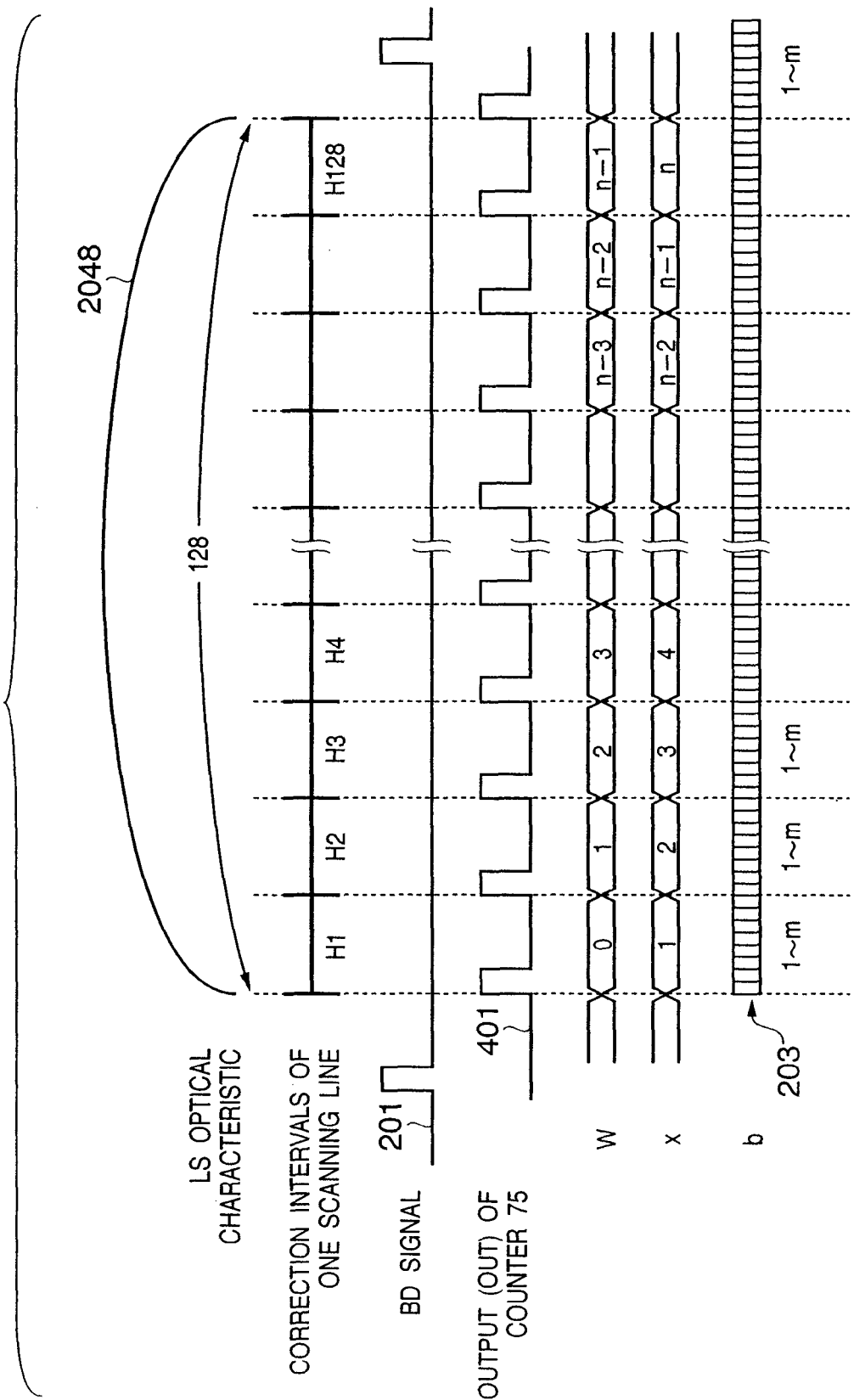
FIG. 6 is a timing chart for describing the generation of correction data by the correction unit according to the first embodiment.

FIG. 6 is a timing chart for describing the generation of correction data by the correction unit 52 of FIG. 4. Here one scanning line is 2048 pixels, the scanning line is divided into 128 blocks (n=127) (correction intervals (H1 to H128)) and each correction interval corresponds to 16 pixels (m=16). Further, W represents the output of latch 76, X the output of memory 74 and b (203) the output of arithmetic unit 77.

The operation of the correction unit 52 will now be described with reference to FIGS. 4 to 6. The description will be rendered for a case where the correction interval of one scanning line corresponds to 16 pixels, one scanning line is 2048 pixels and the number of correction intervals per scanning line is 128 (n=127 in FIG. 5).

First, when the BD signal 201, which is output from the beam detector 60, is input to the memory 74 and to a reset terminal (RST) of the counter 75, the address of the memory 74 and the count value of the counter 75 are cleared to "0". The counter 75 is a 4-bit counter and the output (OUT) 401 thereof is a carry signal.

In correction interval H1, initially 16 pulses of the pixel clock signal (CLK) 400 enter as a dummy signal, whereupon the carry signal (OUT) 401 of the counter 75 is output as a pulse signal of one clock. As a result, $0^{th}$ correction data of the primary scan direction being output from the memory 74 is latched in the latch 76, and the output of the memory 74 becomes the first item of correction data of the primary scan direction stored at the next address (see FIG. 5). As a result, the $0^{th}$ correction data (W) of the primary scan direction enters the input ADATA of the arithmetic unit 77, and the first item of correction data (X) of the primary scan direction enters the input BDATA of the arithmetic unit 77 from the memory 74. Accordingly, the arithmetic unit 77 calculates the difference between the two inputs W and X, linearly interpolates the difference at "16" corresponding to the number of pixels of one correction interval and outputs the interpolation data (73 in FIG. 3) as correction signal b (203) in sync with the pixel clock (CLK) 400.

In other words, a linear interpolation is performed from two items of correction data that have been stored at adjacent addresses of memory 74, linearly interpolated correction data (1 to m in FIG. 6) finely divided in units of 16 bits is calculated and this is output as new correction data (203).

Furthermore, the correction in the laser irradiation unit 28 is performed by the laser driving controller 54 based upon the b signal 203, thereby controlling the light-emission current value or light-emission time of the semiconductor laser 55.

When correction interval H1 thus ends, the correction interval H2 starts next, the pulse signal 401 is output from the counter 75, the first item of correction data (W) of the primary scan direction that has been output from the memory 74 is latched in the latch 76, and the output of the memory 74 becomes the second item of correction data (X) of the primary scan direction stored at the next address. The arithmetic unit 77 calculates the difference between the two inputs W and X, linearly interpolates the difference at "16" corresponding to the number of pixels of one correction interval and outputs the interpolation data as correction signal 203 in sync with the pixel clock (CLK) 400. Thus, correction data in the correction interval H2 is generated and output as the correction signal 203.

Thenceforth, and in similar fashion, the correction signal 203 is output from the arithmetic unit 77 in every correction interval (H3 to H128), and drive of the semiconductor laser 55 is controlled based upon the correction signal 203.

In the first embodiment, an example in which the optical-properties correction data for the laser irradiation unit 28 is stored in memory 74 is described. However, it goes without saying that similar results will be obtained even if density-unevenness correction data for the photosensitive drum 21 is stored in the memory 74, the above-described processing is executed and the laser driving controller 54 is controlled by the correction signal thus obtained.

In the example of FIG. 4, the memory 74 is described as being a FIFO memory. However, the present invention is not limited to this arrangement. For example, the memory 74 may be implemented by an ordinary memory (RAM) and the count value from the counter 75 may be input as the address of the memory 74. In this case, if the arrangement is applied to the above-described example, use is made of a first 4-bit counter and a second counter for counting the carry output of the 4-bit counter, and the output of the second counter is adopted as the address of memory 74.

Alternatively, in the example described above, the address space of memory 74 is assumed to be 1028 addresses and each item of 0 to n correction data of the primary scan direction is stored at each address. However, by storing the $0^{th}$ item of correction data of the primary scan direction at addresses 0 to 15 of memory 74, storing the first item of correction data of the primary scan direction at addresses 16 to 31 of memory 74, storing the second item of correction data of the primary scan direction at addresses 32 to 47 of memory 74 and so on, an operation similar to that of counter 75 and memory 74 in FIG. 4 can be realized using one counter that is counted up pixel by pixel, and a memory to which the output of this counter is input as the address.

Second Embodiment

A second embodiment of the present invention will now be described.

Figure 7:
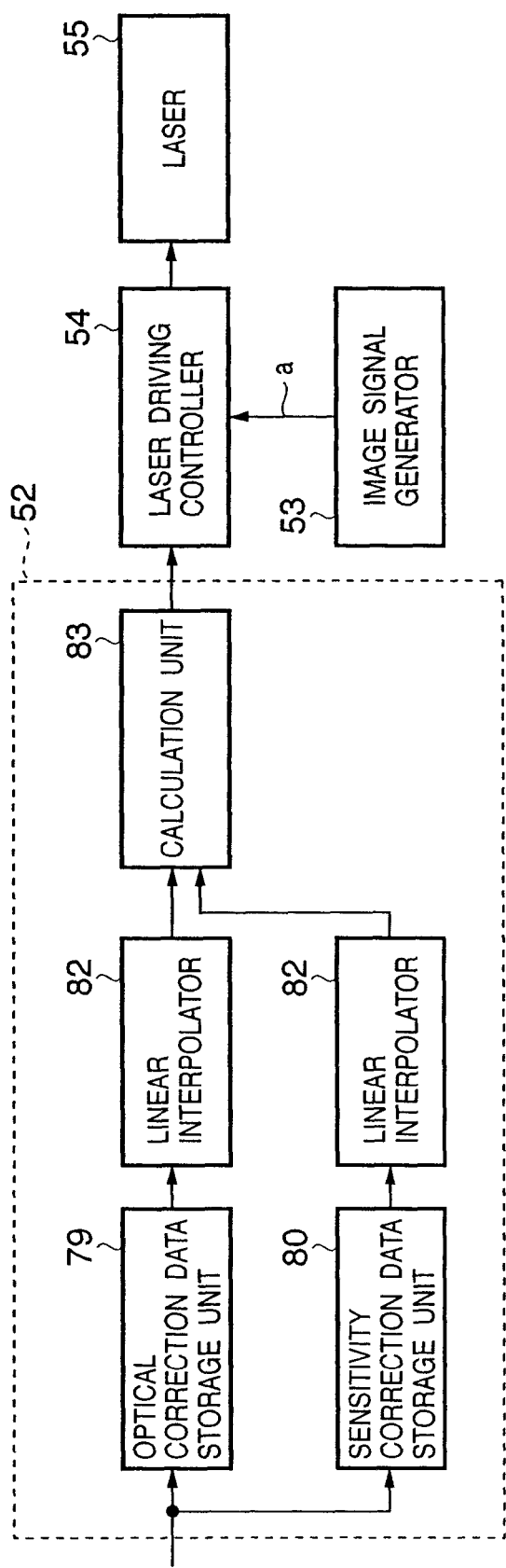
FIG. 7 is a block diagram for describing a correction unit and a driver circuit of a semiconductor laser according to a second embodiment of the present invention.

FIG. 7 is a block diagram for describing the correction unit 52 and the driver circuit of the semiconductor laser 55 according to a second embodiment of the present invention. Components similar to those in FIG. 2 are designated by like reference characters.

In the first embodiment, the characteristic of the laser irradiation unit 28 or the characteristic of the photosensitive drum 21 is corrected. The characterizing feature of the second embodiment, however, is that both corrections can be performed simultaneously in order to achieve even better image quality.

An optical correction data storage unit 79 stores the correction data of the laser irradiation unit 28. A sensitivity correction data storage unit 80 stores correction data for correcting sensitivity unevenness of the photosensitive drum 21. The sensitivity correction data storage unit 80 corresponds to the memory 74 of the first embodiment. A linear interpolator 82 performs linear interpolation of correction data that has been read out of the optical correction data storage unit 79 or sensitivity correction data storage unit 80 and corresponds to the arithmetic unit 77 of the first embodiment. A calculation unit 83 adds linearly interpolated correction data from the linear interpolator 82. As a result, it is possible to correct the drive signal of the semiconductor laser in accordance with the laser irradiation unit 28 and photosensitive drum 21, thus making it possible to obtain a higher image quality.

In the second embodiment, the correction data for the photosensitive drum is stored in the sensitivity correction data storage unit 80. However, similar results can be obtained even by a method of measuring surface potential of the photosensitive drum 21 in the primary scan direction using a surface electrometer, converting the measurement data to digital data and storing the digital data successively in the sensitivity correction data storage unit 80.

FIG. 8 is a flowchart for describing laser drive control in a color printer according to this embodiment of the present invention.

First, at step S1, one scanning interval of the laser beam is divided into a plurality of blocks and the number of pixels (16 in this example) corresponding to each block is obtained. Next, at step S2, the laser beam is modulated in accordance with the image signal and laser scanning for scanning the laser beam is started. This is followed by step S3, at which correction data corresponding to the block currently being scanned by the laser beam is read out of the memory 74. Then, at step S4 correction data for the block neighboring this block is read out and correction data corresponding to the block currently being scanned by the laser beam is decided (step S5) based also upon the data read out at step S3 (by the interpolation described in the example above). Next, at step S6, laser drive by the laser driving controller 54 is controlled in accordance with the correction data obtained at step S5. Control by the laser driving controller 54 is such that in addition to pulse-width modulation (PWM) conforming to the image signal, the pulse width of this pulse-width modulated signal, or the drive current that prevails when the pulse is applied, is adjusted in accordance with the correction data of the kind shown in FIG. 3.

Next, at step S7, it is determined whether the block currently being scanned has ended and the laser beam has shifted to the next block. If the decision rendered is "NO", then control returns to step S6. If the laser beam has shifted to the next block ("YES" at step S7), then it is determined at step S8 whether one scan has ended. When one scan has not ended, control returns to step S3 and the above-described processing is executed. In the case of the second embodiment, both correction data of the optical system and correction data of the photosensitive drum are read out at steps S3 and S4, and each type of correction data, namely the correction data of the optical system and correction data of the photosensitive drum, is decided at step S5.

The object of the invention is attained also by supplying a storage medium storing the program codes of the software for performing the functions of the foregoing embodiment (e.g., the procedure of FIG. 8) to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

The present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-074711 filed Mar. 16, 2004, which is hereby incorporated by reference herein.

What is claimed is:
1. An image forming apparatus comprising:
a photosensitive member;
a laser light source that irradiates a laser light for forming an electrostatic latent image on the photosensitive member, based on a driving signal;
a deflecting-scanning unit that deflects and scans the laser light irradiated by the laser light source onto the photosensitive member;
a storage unit that stores correction data for correcting an amount of laser light irradiated by the laser light source or a time period of irradiating the laser light by the laser light source, wherein the correction data includes a plurality of items of correction data, each item corresponding to each of a plurality of blocks into which one scanning interval of the laser light is divided;
a detection unit that detects the laser light deflected and scanned by the deflecting-scanning unit;
a counter unit that counts a reference clock generated during scanning of the laser light to generate a count signal corresponding to a current block in which the laser light is scanning, in response to the detection unit detecting the laser light;
a correction unit that reads out, based on the count signal generated by the count unit, first correction data corresponding to the current block and second correction data corresponding to an immediately preceding block to the current block from the storage unit, and corrects the driving signal for driving the laser light source based on the first and second correction data to irradiate the current block with the laser light; and
a driving unit that drives the laser light source in accordance with the driving signal corrected by the correction unit.

2. The image forming apparatus according to claim 1, further comprising an optical unit provided between the photosensitive member and the deflecting-scanning unit,
wherein the plurality of items of correction data include correction data for correcting optical characteristics of the optical unit with respect to the plurality of blocks.

3. The image forming apparatus according to claim 1, further comprising a charger unit that electrically charges the photosensitive member,
wherein the plurality of items of correction data include correction data for correcting charging characteristics of the photosensitive member with respect to the plurality of blocks.

4. The image forming apparatus according to claim 1, wherein the correction unit performs a linear interpolating process of the first and second correction data to correct the driving signal based on a result of the linear interpolating process.

5. The image forming apparatus according to claim 1, wherein each of the plurality of blocks includes a plurality of pixels,
the driving unit drives the laser light source based on the driving signal and the reference clock, and
the correction unit corrects the driving signal corresponding to each pixel based on the first and second correction data.

* * * * *